(12) United States Patent
Lim

(10) Patent No.: US 7,675,668 B2
(45) Date of Patent: Mar. 9, 2010

(54) BARRIER AND IMAGE DISPLAY DEVICE WITH THE SAME

(75) Inventor: Eun Jung Lim, Gunpo-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/455,405

(22) Filed: Jun. 19, 2006

(65) Prior Publication Data

US 2007/0047058 A1  Mar. 1, 2007

(30) Foreign Application Priority Data

Aug. 31, 2005  (KR) .................. 10-2005-0080560

(51) Int. Cl.
*G02F 1/153* (2006.01)
*H04N 5/45* (2006.01)
*G02F 1/1335* (2006.01)

(52) U.S. Cl. ............ 359/267; 348/E13.01; 348/E13.03; 348/565; 349/64

(58) Field of Classification Search ............... 359/267, 359/265; 349/64; 348/565, E13.01, E13.03
See application file for complete search history.

(56) References Cited

U.S. PATENT DOCUMENTS

| | | | | |
|---|---|---|---|---|
| 5,831,765 | A | * | 11/1998 | Nakayama et al. ........... 359/464 |
| 6,124,920 | A | * | 9/2000 | Moseley et al. ............. 349/201 |
| 2004/0169920 | A1 | * | 9/2004 | Uehara et al. ............... 359/443 |
| 2006/0001937 | A1 | * | 1/2006 | Drinkwater ................. 359/200 |
| 2007/0058258 | A1 | * | 3/2007 | Mather et al. ............... 359/619 |
| 2007/0085814 | A1 | * | 4/2007 | Ijzerman et al. ............. 345/102 |
| 2007/0091638 | A1 | * | 4/2007 | Ijzerman et al. ............. 362/611 |
| 2007/0206134 | A1 | * | 9/2007 | Sung et al. .................... 349/96 |

* cited by examiner

*Primary Examiner*—Jessica T Stultz
*Assistant Examiner*—Mahidere S Sahle
(74) *Attorney, Agent, or Firm*—Brinks Hofer Gilson & Lione

(57) ABSTRACT

A 3D image display device with a 2D or 3D image mode switching barrier is provided. The image display device includes an image panel, color change regions spaced apart from each other in a repetitive pattern and selectively change into light transmission regions or light blockage regions, and a barrier having the color change regions.

15 Claims, 5 Drawing Sheets

BARRIER AND IMAGE DISPLAY DEVICE WITH THE SAME

This application claims the benefit of the Korean Patent Application No. 2005-0080560, filed on Aug. 31, 2005, which is hereby incorporated by reference as if fully set forth herein.

BACKGROUND

1. Field

A three-dimensional image display device with a two- or three-dimensional image mode switching barrier is provided.

2. Related Art

Three-dimensional (3D) image display devices are considered as a next-generation high-value added technology and a platform technology for next generation 3D multimedia telecommunication in various industry fields, such as information system, broadcasting, medical treatment, education, aviation, game, animation, and virtual reality.

The 3D image display device creates a 3D image effect using a binocular disparity. In the binocular disparity, a 3D effect is provided when a person's eyes simultaneously look in two respectively different directions.

3D image display devices include glass-type and non-glass type devices. In the glass-type device, a person wears a pair of glasses with respectively different lens on each eye and views a 3D image using an anaglyph method, a polarizing method, or a time-share method. However, it is uncomfortable to wear glasses and also impossible to observe other objects.

The non-glass type device includes a lenticular method and a parallax barrier method. In the lenticular method, a lenticular lens plate is installed on a front of an image panel. In the parallax barrier method, a mask that has transparent slits and opaque slits that are alternately arranged is installed in a front of an image panel.

FIG. 1 is a view of a 3D image display device in a related art parallax barrier method.

As illustrated in FIG. 1, the 3D image display device includes a liquid crystal panel 10 displaying an image corresponding to a left eye and a right eye. A backlight 20 of a light source is disposed in a rear of the liquid crystal panel. A barrier 30 is disposed on a front of the liquid crystal panel with transparent slits and opaque slits arranged alternately.

When an audience 40 views an image generated from the liquid crystal panel through the transparent slits of the barrier 30, the audience 40 can view a 3D effect by observing respectively different pixel regions of the liquid crystal panel (even though the left eye and the right eye of the audience 40 view an identical transparent slit P).

That is, the left eye of the audience 40 views an image R1 corresponding to the left eye of the liquid crystal panel through the transparent slit P, and the right eye of the audience 40 views an image L1 corresponding to the right eye of the liquid crystal panel through the transparent slit P. Therefore, the audience 40 can view a 3D effect.

However, the barrier 30 needs to be removed in the 3D image display device when the audience 40 wants to watch a 2D image.

SUMMARY

A 3D image display device with a 2D or 3D image mode switching barrier is provided.

A barrier includes color change regions spaced apart from each other in a repetitive pattern, and selectively changing into light transmission regions or light blockage regions.

An image display device includes an image panel. The color change regions are spaced apart from each other in a repetitive pattern, and selectively change into light transmission regions or light blockage regions. A barrier has the color change regions.

The barrier with the photochromic layer is formed on a transparent substrate on one side of the image panel.

The photochromic layer is formed on the light guide plate projecting an UV light to the barrier on one side of the image panel.

The barrier is formed on the image panel, and a light source unit provides an UV light in a specific wavelength range to the barrier is formed on another side of the image panel.

The light source unit can be formed on a layer different from the layer on which the backlight unit that provides light to the image panel is formed, and a light source for the barrier and a light source for the image panel can be disposed together on the backlight unit.

The audience can conveniently view a 2D image or a 3D image as he/she wishes by projecting a specific UV wavelength on the 2D or 3D image mode switching barrier. The 2D or 3D image mode switching barrier with the photochromic layer can be easily manufactured using simple processes.

It is to be understood that both the foregoing general description and the following detailed description of the present embodiments are exemplary and are intended to provide further explanation of the invention as claimed.

DRAWINGS

The accompanying drawings are included to provide a further understanding of the invention and are incorporated in and constitute a part of this application, illustrate embodiment(s). In the drawings.

DESCRIPTION

Reference will now be made in detail to the preferred embodiments, examples of which are illustrated in the accompanying drawings. Wherever possible, the same reference numbers will be used throughout the drawings to refer to the same or like parts.

Figure 1:
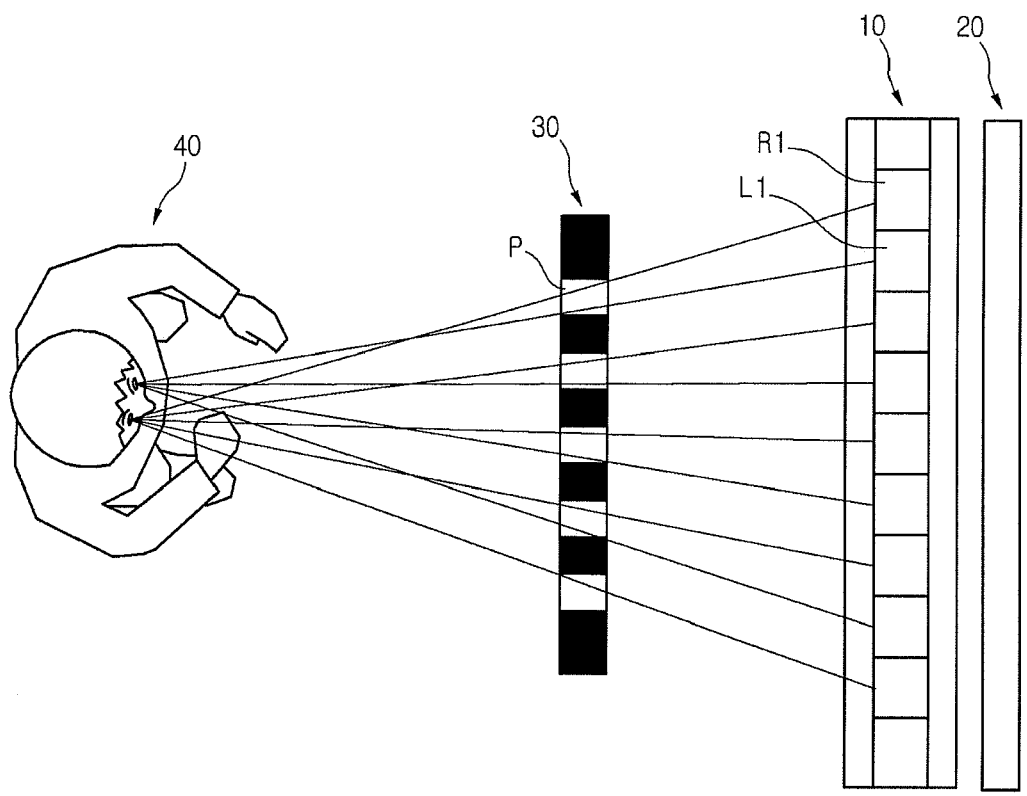
FIG. 1 is a view of a 3D image display device in a related art parallax barrier method.
Figure 2:
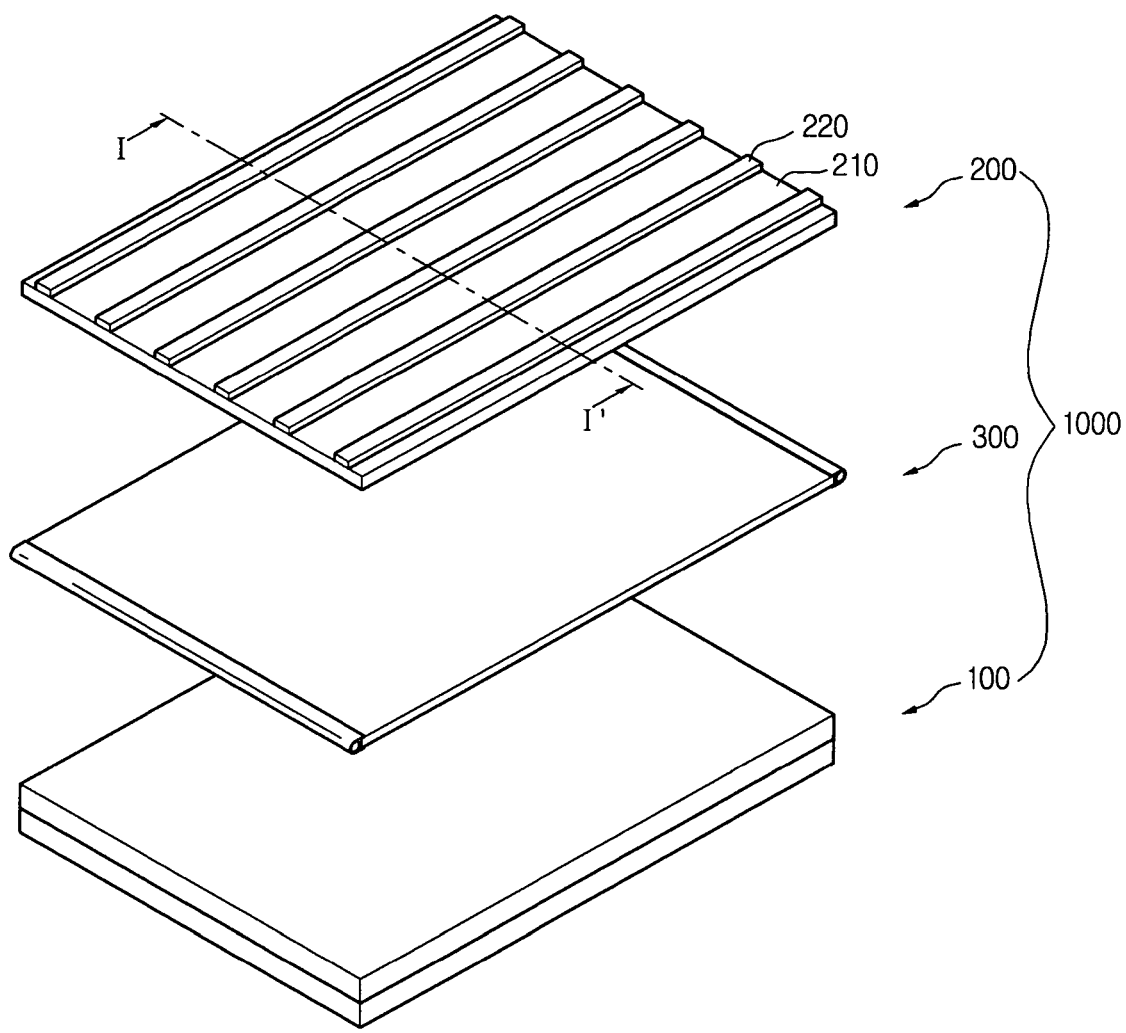
FIG. 2 is a perspective view of a 3D image display device according to a first embodiment.
Figure 3:
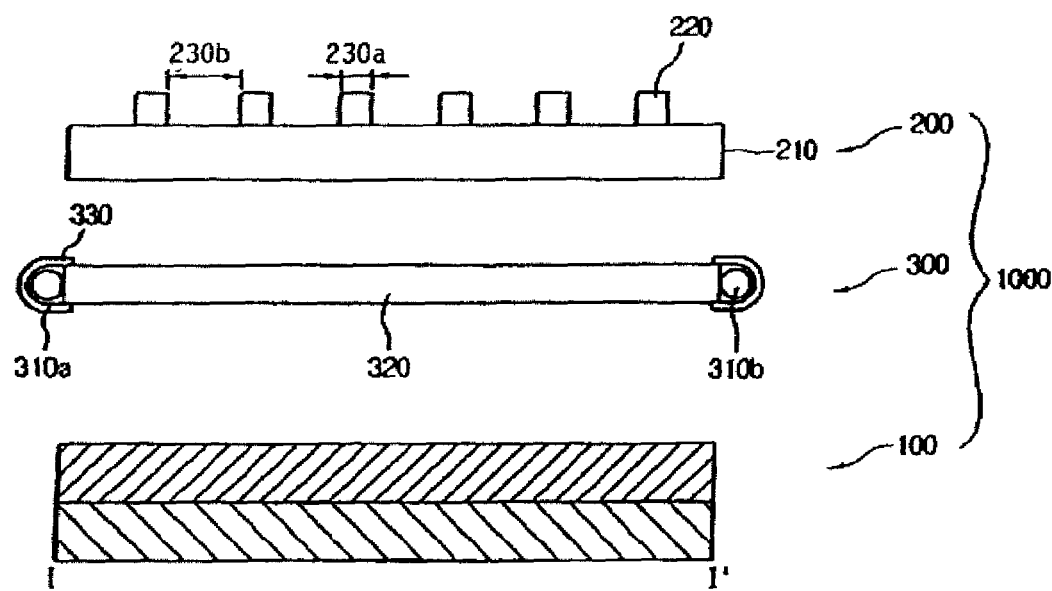
FIG. 3 is a sectional view taken along line I-I' of FIG. 2.

FIG. 2 is a perspective view of a 3D image display device according to a first embodiment. FIG. 3 is a sectional view taken along line I-I' of FIG. 2.

Referring to FIGS. 2 and 3, the 3D image display device 1000 includes an image panel 100 displaying an image, and a 2D or 3D image mode switching barrier 200.

The 2D or 3D image mode switching barrier 200 includes first regions 230a and second regions 230b which are alternately arranged. A substrate 210 has the first regions 230a and the second regions 230b disposed on it. A photochromic layer 220 is formed on the first region 230a.

The substrate 210 can be formed of transparent plastic or glass. For example, the plastic can be formed of an acryl-based resin, a polyurethane-based resin, or a polycarbonate-based resin.

The photochromic layer 220 can be formed of a photochromic compound that can display colors or be transparent according to an ultraviolet (UV) irradiation. For example, when a specific wavelength in an UV range is projected on the photochromic compound, an original color is displayed. When another specific wavelength is projected on the photochromic compound with the original color, the photochromic compound becomes transparent. This color change occurs because the photochromic compound changes the molecular arrangement according to one wavelength, and then restores the molecular arrangement to an original state according to another wavelength.

When the photochromic layer 220 with the photochromic compound is formed on the first region 230a, the first region 230a can be transparent or opaque according to a wavelength. In other words, the 2D or 3D image mode switching barrier 200 can be a transparent substrate through the photochromic layer 220 formed on the first region 230a, or a barrier for a 3D barrier having the transparent slits and the opaque slits that are alternately arranged.

The photochromic layer 220 may be formed of a photochromic compound with a reversible color change in a wavelength range of 450 nm or below. Since the image panel 100 emits a wavelength of 450 nm or above, the photochromic layer 220 becomes transparent or opaque by the emitted wavelength from the image panel 100. This arrangement makes it difficult to control a 2D or 3D image mode switching barrier 200.

The photochromic layer 220 is formed of at least one selected from the group consisting of a spiropyrane-based compound, an azobenzen-based compound, a diarylethene-based compound, a spironaphthoxazine-based compound, and dihydropyridine and furylfulgide derivatives.

The photochromic layer 220 may be formed by mixing the spiropyrane-based compound, the azobenzen-based compound, and the diarylethene-based compound. The spiropyrane-based compound changes into red in a 350 nm wavelength. The azobenzen-based compound changes into green in a 340 nm wavelength. The diarylethene compound changes into blue in a 310 nm wavelength. Each photochromic compound becomes transparent in a 390 nm wavelength. When wavelengths of 310 nm, 340 nm, and 350 nm are projected on the photochromic layer 220 of the photochromic compounds, each photochromic compound displays red, green, and blue, respectively, and thus the photochromic layer 220 displays black. Consequently, light can not pass through the photochromic layer 220.

When a 390 nm wavelength is projected on the photochromic layer 220, each photochromic compound becomes transparent, and thus the photochromic layer 220 becomes transparent.

The photochromic layer 220 is formed of a solvent including, for example, the photochromic compounds, a binder, a dispersing agent, and a solvent through the related art methods (e.g., a deep coating, a spin coating, a doctor blade, and an inkjet printing). The present embodiment is not limited to the related art methods. Therefore, the 2D or 3D image mode switching barrier 200 can be easily manufactured using the simple processes above.

The photochromic layer 220 may be formed of thickness of 400 to 2000 Å. When the photochromic layer 220 is formed of thickness of below 400 Å, a portion of light passes through the photochromic layer 220 because of the small thickness. When an audience views a 3D image through the 2D or 3D mode switching barrier 200, a high quality 3D image can not be displayed because the image is passed through the opaque slits. When the photochromic layer 220 is formed of thickness of above 2000 Å, a viewable area of a 2D image is reduced because of a diffraction phenomenon that occurs due to the step difference when an audience views a 2D image through the 2D or 3D image mode switching barrier 200.

Since a photochromic compound constituting the photochromic layer 220 can be easily separated or transformed in a powder form, a protection layer (not shown) can be further included on the photochromic layer 220. The protection layer can be formed of an acryl-based resin, a polyurethane-based resin, or a silicon-based resin.

The photochromic layer 220 can be protected by disposing and attaching a top substrate (not shown) facing the substrate 210 on and to the photochromic layer 220. At this point, the top substrate may be a transparent plastic substrate or glass substrate.

The image panel 100 can include a liquid crystal display device (LCD), an organic electroluminescent display device (OLED), a plasma display panel (PDP), a cathode ray tube (CRT), or a field emission display device (FED), which can display an image for the left eye and the right eye. The audience can view a 2D or 3D image using the image for the left eye and the right eye according to the 2D or 3D image mode switching barrier 200.

At least one side of the 2D or 3D image mode switching barrier 200 includes a light source unit 300 projecting an UV wavelength.

The light source unit 300 includes first and second UV light sources 310a and 310b. A light guide plate 320 is disposed on one side of the first and second UV light sources 310a and 310b. As shown in FIG. 3, the first and second UV light sources 310a and 310b are disposed on both sides of the light guide plate 320, but the present embodiment is not limited thereto. That is, the first and second UV light sources 310a and 310b can be disposed on one side of the light guide plate 320.

For example, the first UV light source 310a emits a wavelength of below 390 nm, and the second UV light source 310b emits a wavelength of 390 to 450 nm.

The light guide plate 320 projects the emitted wavelengths from the first and second UV light sources 310a and 310b to a front of the first and second UV light sources 310a and 310b. The light guide plate 320 may be formed of a transparent plastic or glass. For example, the transparent plastic can be formed of an acryl-based material, a polyurethane-based material, or a polycarbonate-based material.

The light guide plate 320 can further include a housing 330 that fixes the first and second UV light sources 310a and 310b. The housing 330 reflects and guides the emitted wavelength from the first and second UV light sources 310a and 310b to be projected toward the light guide plate 320.

Figure 4A:
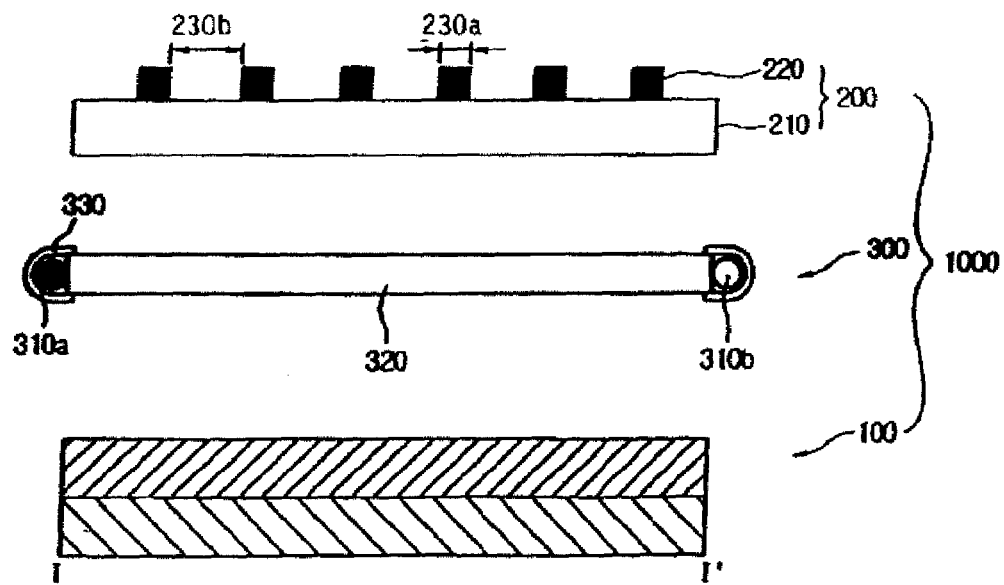
FIGS. 4A and 4B are sectional views taken along line I-I' of FIG. 2 when a 2D image and a 3D image are displayed in a 3D image display device, respectively.
Figure 4B:
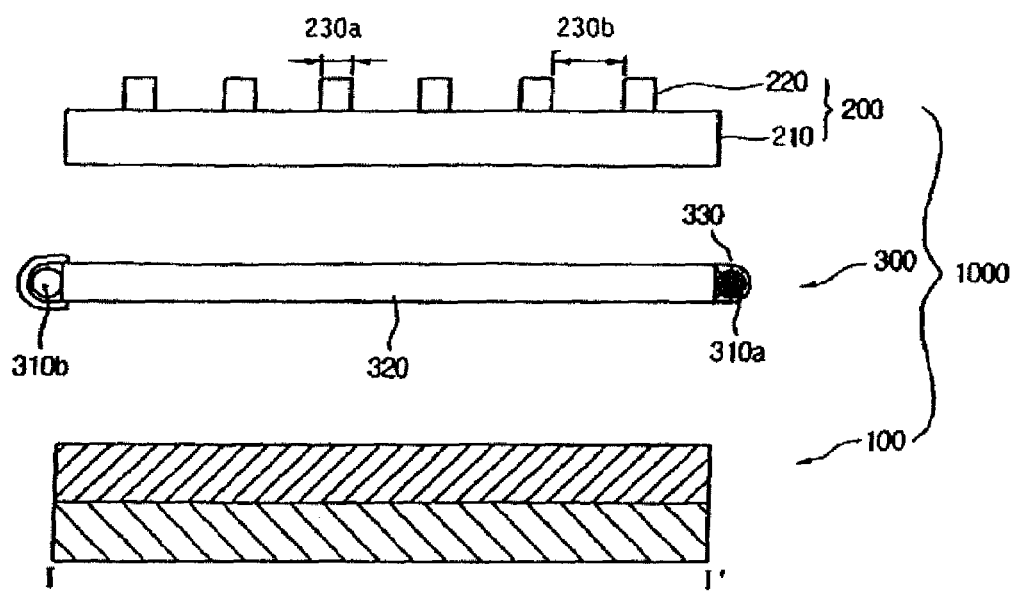

FIGS. 4A and 4B are sectional views taken along line I-I' of FIG. 2 when a 2D image and a 3D image are displayed in a 3D image display device, respectively.

As shown in FIG. 4A, when the audience views a 3D image using the 3D display device, the light source unit 300 turns on the first UV light source 310a to project a wavelength of below 390 nm to the 2D or 3D image mode switching barrier 200. Therefore, the photochromic layer 220 on the first region 210a becomes opaque, and blocks light. By turning off the first UV light source 310a, the first region 230a becomes opaque slit regions and the second regions 230b become transparent slit regions in the 2D or 3D image mode switching barrier 200. In other words, the 2D or 3D image mode switching barrier 200 changes into the 3D barrier with transparent slit regions 230b and opaque slit regions 230a that are alternately arranged. Since the image panel 100 displays an image for the left eye and an image for the right eye, the audience can view a 3D image.

As shown in FIG. 4b, when the audience views a 2D image using the 3D image display device, the light source unit 300 turns on the second UV light source 310b to project a wavelength of 390 to 450 nm to the 2D or 3D image mode switching barrier 200. Therefore, the photochromic layer 220 on the first region 230a becomes transparent. By turning off the second UV light source 310b, the 2D or 3D image mode switching barrier 200 changes into a transparent substrate because the second region 230b first region 230a become transparent. The audience can then view a 2D image. Consequently, it is unnecessary to remove the barrier when the audience wants to watch a 2D image.

Consequently, it is unnecessary to remove the barrier when the audience wants to watch a 2 D image.

Figure 5:
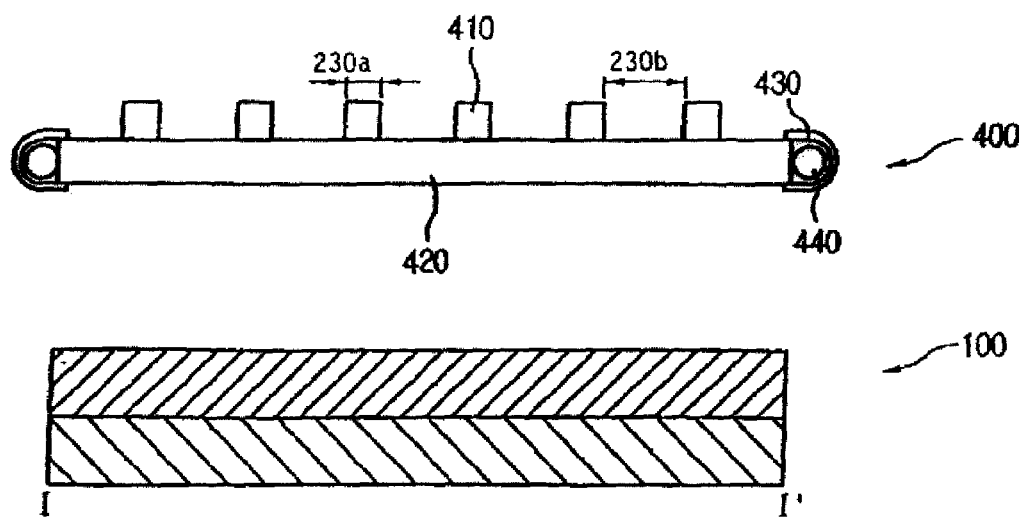
FIG. 5 is a sectional view of a 3D image display device according to a second embodiment.

FIG. 5 is a sectional view of a 3D display device according to a second embodiment of the present invention.

Referring to FIG. 5, the image display device includes an image panel 100. A light guide plate 420 is formed on the image panel 100. A light source unit 400 has an UV lamp that projects an UV light in a specific wavelength range to the light guide plate 420. A photochromic layer 410 is formed on the light guide plate 420.

The photochromic layer 410 has transparent or opaque characteristics in a specific wavelength range as illustrated in the first embodiment.

The photochromic layers 410 are spaced apart from each other in a repetitive pattern. The UV lamp 440 is disposed on a side of the light guide plate 420 to project a light in a specific wavelength range to the photochromic layer 410. A housing 430 is formed around the UV lamp 440 to improve a light efficiency.

In the 2D or 3D image mode switching barrier with the photochromic layer 410, a first region 230a becomes opaque or transparent, and a second region 230b becomes transparent. Switching between 2D or 3D image modes is possible in the image display device according to a wavelength range of light projected toward the photochromic layer 410.

Figure 6:
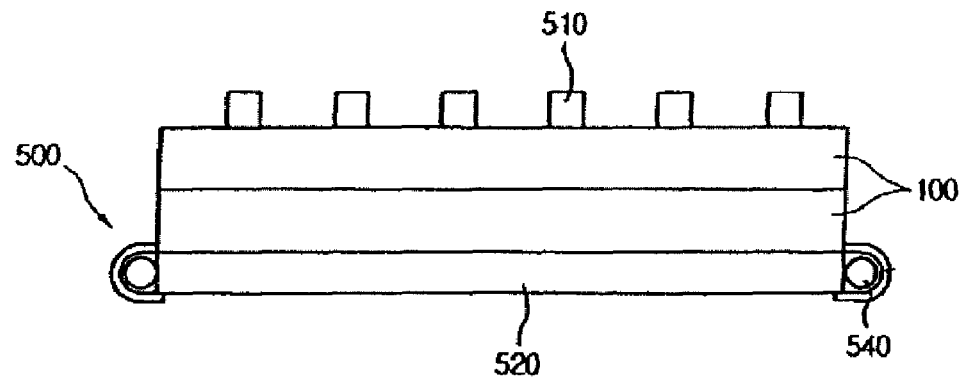
FIG. 6 is a sectional view of a 3D image display device according to a third embodiment.

FIG. 6 is a sectional view of a 3D image display device according to a third embodiment.

As shown in FIG. 6, a barrier includes the photochromic layer 510 spaced apart from each other in a repetitive pattern on one side of the image panel 100. A light source unit 500 is formed on another side of the image panel 100 to project an UV light in a specific wavelength range to the photochromic layer 510.

An UV light from the UV lamp 540 of the light source unit 500 passes through the light guide plate 520 and then image panel 100 to be projected on the barrier.

The photochromic layers 510 are spaced apart from each other in a repetitive pattern. The photochromic layer 510 has transparent or opaque characteristics according to the UV light passing through the image panel 100.

Figure 7:
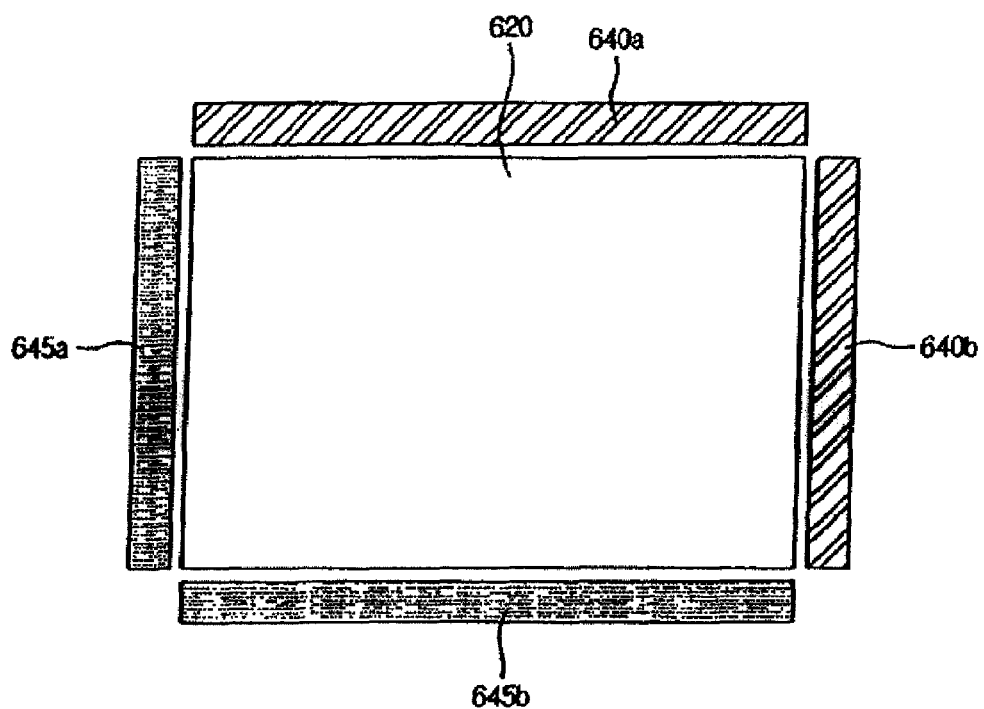
FIG. 7 is a plan view of a backlight unit in a 3D image display device according to a fourth embodiment.

FIG. 7 is a plan view of a backlight unit in a 3D image display device according to a fourth embodiment.

As shown in FIG. 7, the backlight unit is formed on one side of the image panel (not shown).

As described above, a barrier is formed on another side of the image panel (a front in an aspect of the audience). The barrier can be formed on one side of the image panel and a transparent substrate.

The backlight unit includes a light guide plate 620 projecting light uniformly to the image panel. Light sources 640a and 640b for the image panel and light sources 645a and 645b for the barrier can be disposed on each side of the light guide plate 620.

In the light guide plate 620, the light sources 640a and 640b for the image panel are formed on two sides, and the light sources 645a and 645b for the barrier are formed on another two sides.

In at least two light sources for the barrier, one is an UV lamp projecting a wavelength of below 390 nm and the other is an UV lamp projecting a wavelength of 390 to 450 nm.

The light source further includes a housing surrounding the UV lamp.

As described above, the 2D or 3D image mode switching barrier with the photochromic layer can be easily manufactured using simple processes.

Since the 3D image display device with the 2D or 3D image mode switching barrier can be provided, the audience can conveniently view a 2D image or a 3D image as he/she wishes.

It will be apparent to those skilled in the art that various modifications and variations can be made. Thus, it is intended that the present embodiments cover the modifications and variations, provided they come within the scope of the appended claims and their equivalents.

What is claimed is:

1. An image display device comprising:
an image panel;
a barrier having the color change regions spaced apart from each other in a repetitive
pattern on the image panel,
wherein the color change regions selectively change into light transmission regions or
light blockage regions,
a light source between the image panel and the barrier,
wherein the barrier switches an image of the image panel into a 2D or 3D image, and the light source comprises a light guide plate disposed on a surface of the barrier and an at least one UV lamps disposed at a side of the light guide plate.

2. The image display device according to claim 1, wherein one of the UV lamps emits a wavelength of below 390 nm.

3. The image display device according to claim 1, wherein one of the UV lamps emits a wavelength of 390 to 450 nm.

4. The image display device according to claim 1, wherein the image panel comprises selecting one of the group consisting of an LCD (liquid crystal display device), an OLED (organic electroluminescent display device), a PDP (plasma display panel), a CRT (cathode ray tube), and an FED (field emission display device).

5. The image display device according to claim 1, wherein the color change region is formed on a transparent substrate.

6. The image display device according to claim 1, wherein the color change region is formed of a photochromic layer.

7. The image display device according to claim 6, wherein the photochromic layer is formed of at least one selected from the group consisting of a spiropyrane-based compound, an azobenzen-based compound, a diarylethene-based compound, a spironaphthoxazine-based compound, and dihydropyridine and furylfulgide derivatives.

8. The image display device according to claim 6, wherein the photochromic layer has a thickness of 400 to 2000 Å.

9. The image display device according to claim 6, wherein the photochromic layer is formed of a material with a reversible color change in a wavelength range of below 450 nm.

10. The image display device according to claim 1, further comprising a protection layer on the color change region.

11. The image display device according to claim 5, further comprising a top substrate interposed between the substrate and the color change region to face each other.

12. The image display device according to claim 1, wherein the color change region becomes opaque in a wavelength range of below 390 nm to embody a 3D image, and the color change region becomes transparent in a wavelength range of 390 to 450 nm to embody a 2D image.

13. The image display device according to claim 1, wherein the barrier is formed on a light guide plate that projects light to the color change region.

14. The image display device according to claim 1, further comprising a backlight unit disposed on another surface of the image panel to emit light for an image display to the image panel.

15. The image display device according to claim 14, the backlight unit includes a light source for a barrier and a light source for an image panel.

* * * * *